United States Patent
Zhang et al.

(10) Patent No.: US 9,611,423 B2
(45) Date of Patent: Apr. 4, 2017

(54) PETROLEUM FRACTURING PROPPANT PREPARED FROM FLYASH AND WASTE CERAMIC, AND PREPARATION METHOD THEREOF

(71) Applicant: Hebi Tianrui Petroleum Proppant Co., Ltd, Hebi, Henan (CN)

(72) Inventors: Shengjie Zhang, Puyang (CN); Linqun Zhang, Hebi (CN); Yingjun Wang, Anyang (CN)

(73) Assignee: Hebi Tianrui Petroleum Proppant Co., Ltd, Hebi (CN)

( * ) Notice: Subject to any disclaimer, the term of this patent is extended or adjusted under 35 U.S.C. 154(b) by 190 days.

(21) Appl. No.: 14/413,351

(22) PCT Filed: May 29, 2013

(86) PCT No.: PCT/CN2013/076382
§ 371 (c)(1),
(2) Date: Jan. 7, 2015

(87) PCT Pub. No.: WO2014/172954
PCT Pub. Date: Oct. 30, 2014

(65) Prior Publication Data
US 2015/0152319 A1 Jun. 4, 2015

(30) Foreign Application Priority Data

Apr. 25, 2013 (CN) .......................... 2013 1 0148377

(51) Int. Cl.
| | | |
|---|---|---|
| *C09K 8/80* | (2006.01) | |
| *C04B 33/13* | (2006.01) | |
| *C04B 33/132* | (2006.01) | |
| *C04B 33/135* | (2006.01) | |
| *C04B 35/622* | (2006.01) | |
| *C04B 35/626* | (2006.01) | |

(52) U.S. Cl.
CPC .............. *C09K 8/80* (2013.01); *C04B 33/131* (2013.01); *C04B 33/1324* (2013.01); *C04B 33/1352* (2013.01); *C04B 35/62204* (2013.01); *C04B 35/62695* (2013.01); *C04B 2235/3262* (2013.01); *C04B 2235/3472* (2013.01); *C04B 2235/656* (2013.01); *C04B 2235/77* (2013.01); *C04B 2235/96* (2013.01); *Y02P 40/69* (2015.11)

(58) Field of Classification Search
CPC ....................................................... C09K 8/80

USPC ......................................................... 507/271
See application file for complete search history.

(56) References Cited

U.S. PATENT DOCUMENTS

| | | | |
|---|---|---|---|
| 2006/0162929 A1 | 7/2006 | Urbanek | |
| 2010/0105579 A1* | 4/2010 | Pershikova | C09K 8/80 507/203 |

FOREIGN PATENT DOCUMENTS

| | | |
|---|---|---|
| CN | 1085288 A | 4/1994 |
| CN | 1367306 A | 9/2002 |
| CN | 1508390 A | 6/2004 |
| CN | 1844298 A | 10/2006 |
| CN | 101270280 A | 9/2008 |
| CN | 101575503 A | 11/2009 |
| CN | 102015573 A | 4/2011 |
| CN | 102899015 A | 1/2013 |
| RU | 2476476 C2 | 2/2013 |

OTHER PUBLICATIONS

International Preliminary Report on Patentability for PCT/CN2013/076382; I.A. fd: May 29, 2013, issued Oct. 27, 2015 by the International Bureau of WIPO, Geneva, Switzerland.
International Search Report (ISR) for PCT/CN2013/076382; I.A. fd: May 29, 2013, mailed Jan. 9, 2014 from the State Intellectual Property Office of the P.R. China, Beijing, China.
Wang, J-H., "Advance of Ceramic Proppants for Oil Hydraulic Fracture," Bulletin of the Chinese Ceramic Society, Jun. 2010; 29(3):633-636, China Academic Journal Electronic Publishing House, China.

* cited by examiner

Primary Examiner — Aiqun Li
(74) Attorney, Agent, or Firm — Sterne, Kessler, Goldstein & Fox P.L.L.C.

(57) ABSTRACT

Provided is a petroleum fracturing proppant prepared from flyash and waste ceramics, the petroleum fracturing proppant being prepared from the following components: 40 wt. %-90 wt. % of main material, the main material being flyash and waste ceramics; 1 wt. %-40 wt. % of auxiliary material, the auxiliary material being potassium feldspar powder and manganese ore powder; and the sum of the main material and the auxiliary material is 100%. The present invention employs low-cost flyash and waste ceramics as raw material, and the petroleum fracturing proppant prepared under a low temperature has low apparent density and strong crushing resistance, and is also low cost and reduces energy consumption.

8 Claims, No Drawings

PETROLEUM FRACTURING PROPPANT PREPARED FROM FLYASH AND WASTE CERAMIC, AND PREPARATION METHOD THEREOF

The present application claims priority of the patent application (No. 201310148377.7) entitled "petroleum fracturing proppant produced from flyash and waste ceramics and a method for preparing the same" filed with SIPO on Apr. 25, 2013, which is entirely incorporated into the present application by reference.

FIELD OF THE INVENTION

The present invention belongs to the technical field of petroleum fracturing proppant, and particularly relates to a petroleum fracturing proppant produced from flyash and waste ceramics and a method for preparing the same.

BACKGROUND OF THE INVENTION

Fracturing process is widely used in oil and gas production for increasing production of oil well, prolonging high-production life of oil well, and exploiting undeveloped resources. In order to prevent underground fracturing fracture from closure, to retain oil and gas passages and to maintain fracture conductivity capacity, it is necessary to fill the fractures with a proppant. Due to the difference in depth of oil reservoir and in oil viscosity, the requirements for properties of proppants, such as strength, apparent density and particle size, are different. The fracturing proppants are divided into high-density and high-strength proppants, medium-density and high-strength proppants and low-density and high-strength proppants according to bulk density thereof. In recent years, requirements for proppants with a super-low density have appeared. At present, the fracturing proppants on market commonly have a particle size of 16-30 mesh (1180-600 μm), 20-40 mesh (850-425 μm), 30-50 mesh (600-300 μm), 40-60 mesh (425-250 μm), 40-70 mesh (425-212 μm), etc. However, no matter what kind and what specification a petroleum fracturing proppant is, it should have a relatively low apparent density on the premise of having a sufficient crushing resistance, so as to decrease the fracturing cost, guarantee fracture filling saturation and increase production of oil well.

Currently, petroleum fracturing proppants are generally produced with bauxite as main raw material, and one or more metal oxides, such as manganese oxide, calcium oxide, iron oxide, magnesium oxide and zircon, as a mineralizer. Chinese patent No. 02112746.8 discloses a fracturing proppant prepared from, as main raw materials, 45%-55% by weight of sintered bauxite, 10%-30% by weight of kaolin, and 20%-35% weight of red mud produced in Yixing. The above raw materials are pulverized, mixed, pelletized, and sintered to give the fracturing proppant. Chinese patent No. 93111983.9 discloses a fracturing proppant prepared by sintering and pulverizing 70%-90% of sintered bauxite as a main raw material, adding an auxiliary material composed of a multi-component oxide and soft clay for co-milling, adding water or an organic solvent for grinding, then debonding, palletizing, sieving, sintering, polishing and sieving again. Chinese patent No. 02157202.X discloses a fracturing proppant prepared by sintering 90%-94% of high-grade born bauxite and 6%-10% of manganese oxide ore powders at a high temperature of 1330° C.-1350° C. Chinese patent No. 02157202.X discloses a formula widely used in proppant production industry at present, but the fracturing proppant provided by the patent is prepared from high-quality resources such as special-grade or first-grade bauxite and $MnO_2$ or manganese ore with a content of more than 50% at a relatively high temperature. Thus, high energy consumption and high resource consumption in the preparation process limit further development of fracturing proppants.

SUMMARY OF THE INVENTION

In view of this, the technical problem to be solved by the present invention is to provide a petroleum fracturing proppant produced from flyash and waste ceramics and a method for preparing the same. In the present invention, low-cost flyash and waste ceramics are used as raw materials, and a petroleum fracturing proppant is prepared at a low temperature, which exhibits a low apparent density and a high crushing resistance. Moreover, the present invention is low in cost and reduces energy consumption.

The present invention provides a petroleum fracturing proppant produced from flyash and waste ceramics, characterized in that it is prepared from the following components:

40%-90% by weight of a main material that is composed of flyash and waste ceramics; and 1%-40% by weight of an auxiliary material that is composed of potash feldspar powder and manganese ore powder;

wherein sum of the main material and the auxiliary material is 100%.

Preferably, the waste ceramics are a low-aluminum waste ceramics.

Preferably, a mass ratio of the flyash to the waste ceramics is (4-6):(2-3).

Preferably, a mass ratio of the potash feldspar powder to the manganese ore powder is (2-5):1.

Preferably, $MnO_2$ in the manganese ore powder accounts for 0-5% by weight of the petroleum fracturing proppant produced from flyash and waste ceramics.

The present invention further provides a method for preparing a petroleum fracturing proppant from flyash and waste ceramics, comprising the following steps:

A) mixing flyash, waster ceramics, potash feldspar powder and manganese ore powder to perform homogenization and refining treatment, and then sieving it after granulation so as to obtain a mixture; and B) sintering the mixture to obtain the petroleum fracturing proppant produced from flyash and waste ceramics.

Preferably, the waste ceramics are a low-aluminum waste ceramics.

Preferably, the mixture has a particle size of 3350-106 μm.

Preferably, the step A) is particularly: mixing the flyash, the waster ceramics, the potash feldspar powder and the manganese ore powder, placing into a forced mixer to perform homogenization and refining treatment, and then sieving it after granulation so as to obtain a mixture.

Preferably, the sintering is performed for 4-8 h.

Compared to the prior art, by the present invention, a petroleum fracturing proppant produced from flyash and waste ceramics is prepared by using flyash, waste ceramics, potash feldspar powder and manganese ore powder as the raw materials. The present invention takes low-cost flyash and waste ceramics as the raw materials. During the preparation, flyash and $Al_2O_3$ in waste ceramics generate mullite, surplus $SiO_2$ in the raw materials converts to low-apparent-density minerals such as tridymite, thereby reducing the apparent density of products. By using a composite mineralizer formed by $K_2O$ in the potash feldspar powder and $MnO_2$ in the manganese ore powder, a liquid phase making up 30%-40% of the total volume of the raw materials is formed in the raw materials mixed at a high temperature. The formed liquid phase has a large surface tension and good wettability, which renders the materials denser and therefore enhances strength of the petroleum fracturing proppant. In addition, the liquid phase shows a high dissolving capacity to $Al_2O_3$ and $SiO_2$ in the raw materials at 1100° C. When $Al_2O_3$ and $SiO_2$ in the raw materials are dissolved to reach a certain concentration, they react with each other to form needle-like mullite which crystallizes out subsequently, and then dissolves and crystallizes continuously, so that mullitization changes from a solid-phase reaction to a liquid-phase reaction, thereby reaction speed is increased greatly and the temperature required by the reaction is lowered. While the mullite is liquefied, surplus $SiO_2$ converts to double-end spear-shaped tridymite crystals due to the function of the mineralizer, thereby endowing the product with a high strength.

The result shows the petroleum fracturing proppant produced from flyash and waster ceramics that is provided according to the present invention has a bulk density of 1.50 $g/cm^3$ or lower, an apparent density of 2.60 $g/cm^3$ or lower, and a crush rate of 8% or lower under a closure pressure of 86 MPa.

MODE OF CARRYING OUT THE INVENTION

The present invention provides a petroleum fracturing proppant produced from flyash and waste ceramics, characterized in that it is prepared from the following components:

80%-90% by weight of a main material that is composed of flyash and waste ceramics; and 10%-20% by weight of an auxiliary material that is composed of potash feldspar powder and manganese ore powder;

wherein sum of the main material and the auxiliary material is 100%.

The present invention uses flyash and waste ceramics as the main material of petroleum fracturing proppant. The type of the waste ceramics used in the present invention is not particularly restricted, and they are preferably low-aluminum waste ceramics. Low-aluminum waste ceramics and flyash are wasted in a large amount in industry, and are low in cost. Thus, reasonable utilization of low-aluminum waste ceramics and flyash has the significance of energy saving, environment protection, and resource saving. The flyash and waste ceramics make up preferably 40%-90%, more preferably, 50%-80%, and most preferably, 60%-70% by weight of the total amount of the raw materials. In addition, a mass ratio of the flyash to the waste ceramics is preferably (4-6):(2-3), and more preferably, (4.5-5.5):(2.2-2.8).

The present invention uses potash feldspar powder and manganese ore powder as an auxiliary material of the petroleum fracturing proppant, wherein the potash feldspar powder and manganese ore powder form a composite mineralizer with the potash feldspar powder serving as a primary mineralizer, and $K_2O$ in the potash feldspar powder plays the role of mineralization; the manganese ore powder serves as an auxiliary mineralizer and a colorant, and $MnO_2$ in the manganese ore powder accounts for 0-5%, more preferably, 1%-4%, and most preferably, 2%-3% by weight of the petroleum fracturing proppant produced from flyash and waste ceramics. The manganese ore powder and potash feldspar powder are added in an amount of preferably 1%-40%, more preferably, 10%-30%, and most preferably, 15%-25% by weight of the total amount of the raw materials. In addition, a mass ratio of the potash feldspar powder to the manganese ore powder is preferably (2-5):1, more preferably, (2.5-4.5):1, and most preferably, (3-4):1.

By using a composite mineralizer formed of $K_2O$ in the potash feldspar powder and $MnO_2$ in the manganese ore powder, a liquid phase making up 30%-40% of the total volume of the raw materials is formed in the raw materials mixed at high temperature in the present invention. The liquid phase formed has a large surface tension and good wettability, which renders the materials denser, and therefore enhances strength of the petroleum fracturing proppant.

The petroleum fracturing proppant provided in the present invention has a bulk density of 1.50 $g/cm^3$ or lower, and an apparent density of 2.60 $g/cm^3$ or lower. Preferably, the bulk density is 1.40 $g/cm^3$ or lower, and the apparent density is 2.40 $g/cm^3$ or lower.

The present invention further provides a method for preparing petroleum fracturing proppant produced from flyash and waste ceramics, comprising the following steps:

A) mixing flyash, waster ceramics, potash feldspar powder and manganese ore powder to perform homogenization and refining treatment, and then sieving it after granulation so as to obtain a mixture; and B) sintering the mixture to obtain the petroleum fracturing proppant produced from flyash and waste ceramics.

In the present invention, flyash, waster ceramics, potash feldspar powder and manganese ore powder are firstly mixed to perform homogenization and refining treatment. The manner of homogenization and refining is not particularly restricted. The particular method comprises: placing flyash, waster ceramics, potash feldspar powder and manganese ore powder in a forced mixer to perform homogenization and refining treatment. In the present invention, the raw materials are homogenized and refined, which renders particle size of the raw materials to be distributed more uniformly and the chemical reaction to proceed more smoothly and thoroughly, so as to endow the obtained petroleum fracturing proppant with smaller crystal grains and enhanced strength.

Flyash and waste ceramics make up preferably 40%-90%, more preferably, 50%-80%, and most preferably 60%-70% by weight of the total amount of the raw materials. A mass ratio of the flyash to the waste ceramics is preferably (4-6):(2-3), and more preferably, (4.5-5.5):(2.2-2.8). The $MnO_2$ in the manganese ore powder accounts for 0-5% by weight of the petroleum fracturing proppant produced from flyash and waste ceramics. The manganese ore powder and potash feldspar powder are added in an amount of preferably 1%-40%, more preferably, 10%-30%, and most preferably, 15%-25% by weight of the total amount of the raw materials. A mass ratio of the potash feldspar powder to the manganese ore powder is preferably (2-5):1, more preferably, (2.5-4.5):1, and most preferably, (3-4):1.

After flyash, waster ceramics, potash feldspar powder and manganese ore powder are placed in a forced mixer to perform homogenization and refining treatment, they are granulated and then sieved to give a mixture. The manners of granulation in the present invention are not particularly restricted, as long as they are known to those skilled in the art. In addition, there is no particular restriction to the manners of sieving in the present invention, as long as they are known to those skilled in the art. The mixture obtained after sieving has different specifications in particle size, preferably ranging from 3350 to 106 μm, more preferably, from 850 to 425 μm, from 600 to 300 μm, from 425 to 250

µm, from 425 to 212 µm, or from 212 to 106 µm. The waste ceramics used in the present invention are preferably low-aluminum waste ceramics.

In the present invention, the petroleum fracturing proppant produced from flyash and waste ceramics can be obtained by sintering the mixture. There is not particular restriction to the site for sintering in the present invention, and it is preferable to perform sintering in a rotary kiln. The temperature for sintering differs according to the specification of the rotary kiln and the raw materials used, but is preferably between 1100 and 1200° C., and more preferably, between 1110 and 1150° C. The time for sintering is preferably from 4 to 8 h, and more preferably, from 5 to 7 h.

After sintering is complete, the petroleum fracturing proppant produced from flyash and waste ceramics are obtained. The petroleum fracturing proppant produced from flyash and waste ceramics comprises, based on weight percentage, chemical components: $Al_2O_3$ 40%-48%, $SiO_2$ 38%-45%, and $K_2O$ 2%-4%.

By the present invention, a petroleum fracturing proppant prepared from flyash and waste ceramics is prepared by using flyash, waste ceramics, potash feldspar powder and manganese ore powder as the raw materials. The present invention takes low-cost flyash and waste ceramics as the raw materials. During the preparation, flyash and $Al_2O_3$ in waste ceramics generate mullite, surplus $SiO_2$ in the raw materials converts to low-apparent-density minerals such as tridymite, thereby reducing the apparent density of products. By using a composite mineralizer formed by $K_2O$ in the potash feldspar powder and $MnO_2$ in the manganese ore powder, a liquid phase making up 30%-40% of the total volume of the raw materials is formed in the raw materials mixed at a high temperature. The formed liquid phase has a large surface tension and good wettability, which renders the materials denser and therefore enhances strength of the petroleum fracturing proppant. In addition, the liquid phase shows a high dissolving capacity to $Al_2O_3$ and $SiO_2$ in the raw materials at 1100° C. When $Al_2O_3$ and $SiO_2$ in the raw materials are dissolved to reach a certain concentration, they react with each other to form needle-like mullite which crystallizes out subsequently, and then dissolves and crystallizes continuously, so that mullitization changes from a solid-phase reaction to a liquid-phase reaction, thereby reaction speed is increased greatly and the temperature required by the reaction is lowered. While the mullite is liquefied, surplus $SiO_2$ converts to double-end spear-shaped tridymite crystals due to the function of the mineralizer, thereby endowing the product with a high strength.

The result shows the petroleum fracturing proppant produced from flyash and waster ceramics that is provided in the present invention has a bulk density of 1.50 $g/cm^3$ or lower, an apparent density of 2.60 $g/cm^3$ or lower, and a crush rate of 8% or lower under a closure pressure of 86 MPa.

For further understanding of the present invention, the petroleum fracturing proppant produced from flyash and waste ceramics that is provided in the present invention and its preparation method are explained in combination with the following examples, but the protection scope of the present invention is not limited by the following examples.

EXAMPLE 1

60 Kg of dedusted waste ash from HEBIWANHE power plant, 20 Kg of low-aluminum waste ceramics from XIN-ZHONGYUAN ceramic plant in ceramic industrial zone in HEBI city, 15 Kg of potash feldspar powder and 5 Kg of manganese ore powder were mixed to perform homogenization and refining treatment in a forced mixer, subsequently granulated and sieved to obtain a mixture with a particle size ranging from 900 to 600 µm. The mixture was sintered at a temperature between 1100° C. and 1150° C. under atmospheric pressure in a 2.5 m×45 m rotary kiln for 4 h, then cooled and sieved to obtain 20-40 mesh (850-425 µm) petroleum fracturing proppant produced from flyash and waste ceramics.

The petroleum fracturing proppant produced from flyash and waste ceramics was determined to have a bulk density of 1.42 $g/cm^3$, an apparent density of 2.47 $g/cm^3$, and a crush rate of 8% or lower under a closure pressure of 86 MPa.

EXAMPLE 2

50 Kg of dedusted waste ash from HEBIWANHE power plant, 30 Kg of low-aluminum waste ceramics from JIN-JISHAN ceramic plant in ceramic industrial zone in HEBI city, 15 Kg of potash feldspar powder and 5 Kg of manganese ore powder were mixed to perform homogenization and refining treatment in a forced mixer, subsequently granulated and sieved to obtain a mixture with a particle size ranging from 900 to 600 µm. The mixture was sintered at a temperature between 1100° C. and 1150° C. under atmospheric pressure in a 2.5 m×45 m rotary kiln for 4 h, then cooled and sieved to obtain 20-40 mesh (850-425 µm) petroleum fracturing proppant produced from flyash and waste ceramics.

The petroleum fracturing proppant produced from flyash and waste ceramics was determined to have a bulk density of 1.45 $g/cm^3$, an apparent density of 2.50 $g/cm^3$, and a crush rate of 8% or lower under a closure pressure of 86 MPa.

EXAMPLE 3

60 Kg of dedusted waste ash from HEBIWANHE power plant, 20 Kg of low-aluminum waste ceramics from XIN-ZHONGYUAN ceramic plant in ceramic industrial zone in HEBI city, 15 Kg of potash feldspar powder and 5 Kg of manganese ore powder were mixed to perform homogenization and refining treatment in a forced mixer, subsequently granulated and sieved to obtain a mixture with a particle size ranging from 710 to 425 µm. The mixture was sintered at a temperature between 1100° C. and 1150° C. under atmospheric pressure in a 2.5 m×45 m rotary kiln for 4 h, then cooled and sieved to obtain 30-50 mesh (600-300 µm) petroleum fracturing proppant produced from flyash and waste ceramics.

The petroleum fracturing proppant produced from flyash and waste ceramics was determined to have a bulk density of 1.45 $g/cm^3$, an apparent density of 2.52 $g/cm^3$, and a crush rate of 8% or lower under a closure pressure of 86 MPa.

EXAMPLE 4

50 Kg of dedusted waste ash from HEBIWANHE power plant, 30 Kg of low-aluminum waste ceramics from JIN-JISHAN ceramic plant in ceramic industrial zone in HEBI city, 15 Kg of potash feldspar powder and 5 Kg of manganese ore powder were mixed to perform homogenization and refining treatment in a forced mixer, subsequently granulated and sieved to obtain a mixture with a particle size ranging from 710 to 425 µm. The mixture was sintered at a temperature between 1100° C. and 1150° C. under atmospheric pressure in a 2.5 m×45 m rotary kiln for 4 h, then cooled and sieved to obtain 30-50 mesh (600-300 μm) petroleum fracturing proppant produced from flyash and waste ceramics.

The petroleum fracturing proppant produced from flyash and waste ceramics was determined to have a bulk density of 1.48 g/cm$^3$, an apparent density of 2.53 g/cm$^3$, and a crush rate of 8% or lower under a closure pressure of 86 MPa.

EXAMPLE 5

60 Kg of dedusted waste ash from HEBIWANHE power plant, 20 Kg of low-aluminum waste ceramics from XIN-ZHONGYUAN ceramic plant in ceramic industrial zone in HEBI city, 15 Kg of potash feldspar powder and 5 Kg of manganese ore powder were mixed to perform homogenization and refining treatment in a forced mixer, subsequently granulated and sieved to obtain a mixture with a particle size ranging from 500 to 425 The mixture was sintered at a temperature between 1100° C. and 1150° C. under atmospheric pressure in a 2.5 m×45 m rotary kiln for 4 h, then cooled and sieved to obtain 40-60 mesh (425-250 μm) petroleum fracturing proppant produced from flyash and waste ceramics.

The petroleum fracturing proppant produced from flyash and waste ceramics was determined to have a bulk density of 1.47 g/cm$^3$, an apparent density of 2.53 g/cm$^3$, and a crush rate of 8% or lower under a closure pressure of 86 MPa.

EXAMPLE 6

50 Kg of dedusted waste ash from HEBIWANHE power plant, 30 Kg of low-aluminum waste ceramics from JIN-JISHAN ceramic plant in ceramic industrial zone in HEBI city, 15 Kg of potash feldspar powder and 5 Kg of manganese ore powder were mixed to perform homogenization and refining treatment in a forced mixer, subsequently granulated and sieved to obtain a mixture with a particle size ranging from 500 to 425 μm. The mixture was sintered at a temperature between 1100° C. and 1150° C. under atmospheric pressure in a 2.5 m×45 m rotary kiln for 4 h, then cooled and sieved to obtain 40-60 mesh (425-250 μm) petroleum fracturing proppant produced from flyash and waste ceramics.

The petroleum fracturing proppant produced from flyash and waste ceramics was determined to have a bulk density of 1.49 g/cm$^3$, an apparent density of 2.55 g/cm$^3$, and a crush rate of 8% or lower under a closure pressure of 86 MPa.

EXAMPLE 7

60 Kg of dedusted waste ash from HEBIWANHE power plant, 20 Kg of low-aluminum waste ceramics from XIN-ZHONGYUAN ceramic plant in ceramic industrial zone in HEBI city, 15 Kg of potash feldspar powder and 5 Kg of manganese ore powder were mixed to perform homogenization and refining treatment in a forced mixer, subsequently granulated and sieved to obtain a mixture with a particle size ranging from 500 to 355 μm. The mixture was sintered at a temperature between 1100° C. and 1150° C. under atmospheric pressure in a 2.5 m×45 m rotary kiln for 4 h, then cooled and sieved to obtain 40-70 mesh (425-212 μm) petroleum fracturing proppant produced from flyash and waste ceramics.

The petroleum fracturing proppant produced from flyash and waste ceramics was determined to have a bulk density of 1.49 g/cm$^3$, an apparent density of 2.56 g/cm$^3$, and a crush rate of 8% or lower under a closure pressure of 86 MPa.

EXAMPLE 8

50 Kg of dedusted waste ash from HEBIWANHE power plant, 30 Kg of low-aluminum waste ceramics from JIN-JISHAN ceramic plant in ceramic industrial zone in HEBI city, 15 Kg of potash feldspar powder and 5 Kg of manganese ore powder were mixed to perform homogenization and refining treatment in a forced mixer, subsequently granulated and sieved to obtain a mixture with a particle size ranging from 500 to 355 μm. The mixture was sintered at a temperature between 1100° C. and 1150° C. under atmospheric pressure in a 2.5 m×45 m rotary kiln for 4 h, then cooled and sieved to obtain 40-70 mesh (425-212 μm) petroleum fracturing proppant produced from flyash and waste ceramics.

The petroleum fracturing proppant produced from flyash and waste ceramics was determined to have a bulk density of 1.49 g/cm$^3$, an apparent density of 2.56 g/cm$^3$, and a crush rate of 8% or lower under a closure pressure of 86 MPa.

The above is merely preferable embodiments of the present invention. It should be noted that a number of improvements and modifications may be made by those skilled in the art without deviation from the principle of the present invention, and these improvements and modifications should be regarded as falling within the protection scope covered by the present invention.

What is claimed is:

1. A petroleum fracturing proppant produced from flyash and waste ceramics, characterized in that it is prepared from the following components:
   40%-90% by weight of a main material that is composed of flyash and waste ceramics;
   1%-40% by weight of an auxiliary material that is composed of potash feldspar powder and manganese ore powder;
   wherein sum of the main material and the auxiliary material is 100%.

2. The petroleum fracturing proppant according to claim 1, characterized in that a mass ratio of the flyash to the waste ceramics is (4-6):(2-3).

3. The petroleum fracturing proppant according to claim 1, characterized in that a mass ratio of the potash feldspar powder to the manganese ore powder is (2-5):1.

4. The petroleum fracturing proppant according to claim 1, characterized in that MnO$_2$ in the manganese ore powder accounts for 0-5% by weight of the petroleum fracturing proppant produced from flyash and waste ceramics.

5. A method for preparing a petroleum fracturing proppant produced from flyash and waste ceramics, comprising the following steps:
   A) mixing flyash, waste ceramics, potash feldspar powder and manganese ore powder to perform homogenization and refining treatment, and then sieving it after granulation so as to obtain a mixture; and
   B) sintering the mixture to obtain the petroleum fracturing proppant produced from flyash and waste ceramics.

6. The preparation method according to claim 5, characterized in that the mixture has a particle size ranging from 3350 to 106 μm.

7. The preparation method according to claim 5, characterized in that the step A) is particularly: mixing the flyash, the waste ceramics, the potash feldspar powder and the manganese ore powder, placing into a forced mixer to perform homogenization and refining treatment, and then sieving it after granulation so as to obtain a mixture.

8. The preparation method according to claim 5, characterized in that the sintering is performed for 4-8 h.

* * * * *